Nov. 24, 1964  E. O. WALTERS ETAL  3,158,021

LUMBER TESTING APPARATUS

Filed Feb. 6, 1961

Earl O. Walters
Bernarr E. Welch
INVENTORS

BY *Eugene D. Farley*

*Atty.*

United States Patent Office 3,158,021
Patented Nov. 24, 1964

3,158,021
LUMBER TESTING APPARATUS
Earl O. Walters and Bernarr E. Welch, Milwaukie, Oreg., assignors to Western Pine Association, Portland, Oreg., a corporation of Oregon
Filed Feb. 6, 1961, Ser. No. 87,234
9 Claims. (Cl. 73—100)

This invention relates to an apparatus for determining the stress capacity of solid lumber products, the latter including plywood, laminated lumber, and edge or end glued composite lumber.

In order to certify the ability of lumber products to carry a desired work load, it has been the conventional practice to subject it to visual inspection designed to detect natural defects such as knot holes, pitch pockets, rotted areas, etc. It also has been the usual practice to subject the lumber to standard sized static bending tests carried out by flexing selected samples to failure and thereafter assigning to the lumber stress values determined by the results of the tests.

These conventional methods of tests are subject to serious objection in that the allowable working load stresses determined by the conventional static bending tests always are substantially below the actual strength capacity of the lumber product, since they are based on the weakest piece likely to be encountered. In addition, the tests are not suitable for application to plywood and other glued lumber products since weak or defective glue joints can not be detected by visual inspection and since spot checking by applying the static bending test to random samples is haphazard and does not give 100% inspection of the total product.

Still further, the conventional test methods are slow, costly, wasteful of material and not applicable on a continuous, production line basis.

It is the general object of the present invention to provide an apparatus for overcoming the foregoing deficiencies of the prior art methods and apparatus used for determining the stress capacity of solid and glued lumber products.

The manner in which the objects of this invention are accomplished will be apparent from a consideration of the accompanying specification and claims considered together with the drawings, wherein:

Our invention is predicated upon the discovery that, when lumber products of random strength are subjected to bending stress, the ultimate breaking strength of natural defects which might be contained in solid lumber, or of glued end joints which might be contained in composite lumber, is within the elastic limit of the weakest pieces tested. It also is predicated upon the discovery that flexing all of the lumber pieces traversing a production line, to failure of those pieces having insufficient strength, can be accomplished without any adverse effect at all upon the flexed pieces having sufficient stress capacity to withstand the test.

Accordingly, in the practice of the present invention lumber pieces are supported between two spaced support points, preferably in continuous operation, and a predetermined load is applied to each piece at a location between the support points. The resultant deflection of the piece from its normal plane then is detected at a predetermined magnitude to identify those pieces having less stress capacity than a predetermined minimum. Those pieces which do not deflect to the predetermined value comprise the accepted product; those which do deflect to such value, either because of failure or inherent weakness, comprise the rejected product. In one form of the invention, the lumber products are moved longitudinally of their length during the load applying procedure. In another form of the invention, they are moved transversely of their length during this operation.

Figure 1:
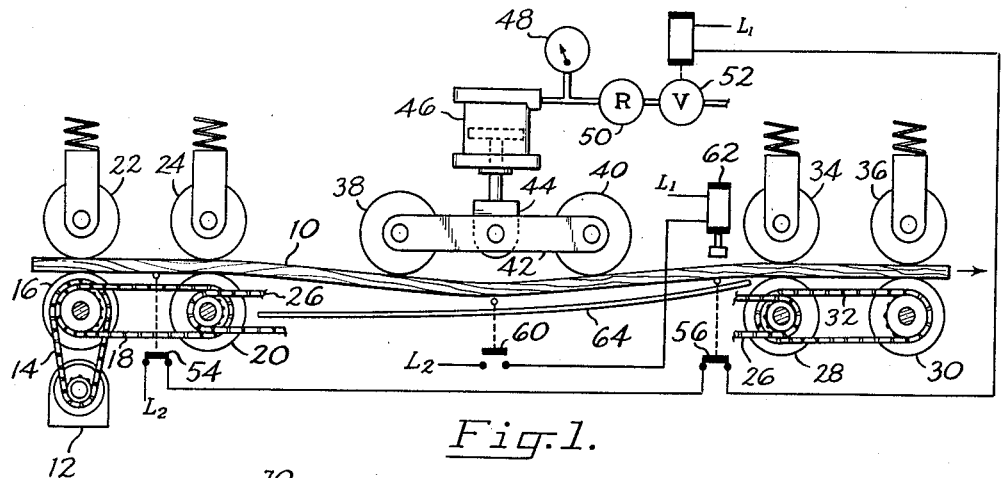
FIG. 1 is a view in elevation of one form of apparatus which may be used in carrying out the present invention.

Considering the foregoing in greater detail and with particular reference to the drawings:

*The Apparatus of FIG. 1*

In the form of the apparatus illustrated in FIG. 1 a board or other lumber product 10 is moved longitudinally of its length by conveying means comprising spaced apart drive rolls, or spaced apart groups of drive rolls. Thus in FIG. 1 a motor 12 drives through chain 14 a first drive roll 16 which is coupled through chain 18 to a second drive roll 20. Spring pressed rolls 22, 24 cooperate with rolls 16, 20 respectively in engaging board 10 and urging it forwardly, toward the right as viewed in FIG. 1.

Drive roll 20 is connected through chain 26 with a second group of drive rolls 28, 30, these being interconnected by chain 32 and cooperating with a pair of spring pressed rolls 34, 36, respectively which are analogous in structure and function to rolls 22, 24.

The space between these two groups of drive rolls affords a loading station for applying the predetermined weight load to the lumber piece. In the illustrated form of the invention the loading means comprises a pair of rollers 38, 40 rotatably mounted between framing bars 42. These in turn are pivotally mounted by means of a pin and clevis assembly 44.

Although various means may be employed for applying a predetermined loading force to rolls 38, 40 it is preferred to use a fluid operated cylinder 46, the piston rod of which is connected to clevis 44. Means then are provided for actuating cylinder 46 to apply load when lumber piece 10 is in the illustrated position, supported at both ends and spanning the loading station.

To this end, the cylinder is actuated through a system including pressure gauge 48, pressure regulator 50 and solenoid-actuated valve 52.

Valve 52 is in a series electric circuit with a first limit switch 54, associated with drive rolls 16, 20 and a second limit switch 56 associated with drive rolls 28, 30. Accordingly when both limit switches are closed, valve 52 advances cylinder 46 to apply load to board 10. However, when either of switches 54, 56 operates to break the electric circuit, cylinder 46 moves to its retracted position.

Means also are present to detect a predetermined magnitude of deflection of lumber piece 10 to ascertain whether it meets the required minimum stress specification. Thus there is provided a switch 60 located opposite loading rollers 38, 40 and in an electric circuit with a marking device 62. A plate 64 is located below rolls 38, 40 to act as a guide and also to accommodate any broken material which may accumulate.

In operation of the apparatus of FIG. 1, lumber piece 10 is introduced between opposed pairs of drive rolls 16, 22, and 20, 24. As it is driven forwardly, it closes switch 54. It then spans the gap between load-applying rolls 38, 40 which are in elevated position.

Thereafter it closes switch 56 and passes between drive roll pairs 28, 34 and 30, 36. Closure of switch 56 energizes solenoid valve 52 which, in turn, actuates cylinder 46. This advances rolls 38, 40, applying a predetermined load to the lumber.

The latter will flex by an amount which is determined by the load applied and its inherent stress capacity. If, through the presence of natural defects, faulty glue lines or inherent weakness, it flexes sufficiently to close switch 60, marker 62 is actuated. This applies a characteristic mark to the piece so that it may be identified as rejected as it leaves the apparatus. In this manner the entire production of a mill may be proof tested so that every piece meets the required minimum stress specification.

The proof-load to be applied to the board may be determined by multiplying the specified normal load by any desired factors. Thus it may be multiplied by a factor required to correct it to long time load conditions (e.g. 0.9); to adjust long time working load stress to standard static bending tests (e.g. 1.78); to adjust for variation between stress imposed by the instant apparatus and minimum actual stress carried in standard static bending test (e.g. 1.54); and to provide a factor of safety for accidental overload (e.g. 1.25). Thus in an exemplary situation, where a 1500$f$ (fiber stress in bending) normal load is stipulated the test stress to be specified would be found by the following computation:

Stress imposed by pre-stress process
$$= 1500f \times .90 \times 1.78 \times 1.54 \times 1.25 = 4600f$$

The value of 4600$f$ would certify that all lumber products passing the proof-load would carry stress in the standard static bending test giving a 1500$f$ working stress under present methods.

Figure 2:
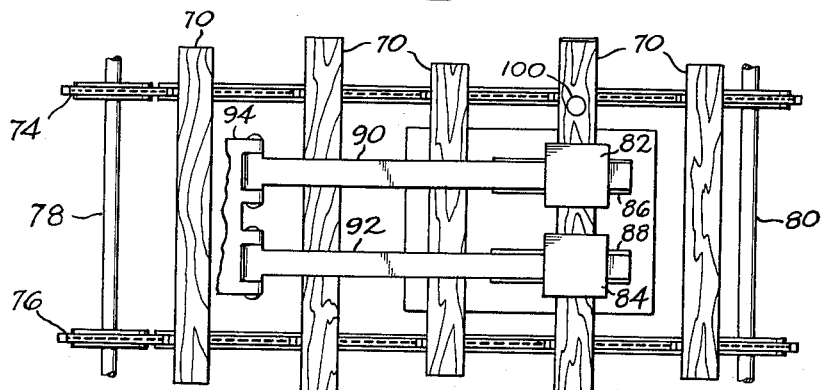
FIGS. 2 and 3 are a plan view and a side elevation, respectively, of another form of apparatus used for determining the strength of lumber.
Figure 3:
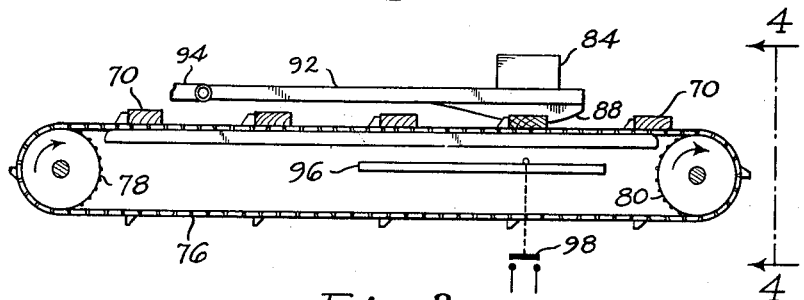
Figure 4:
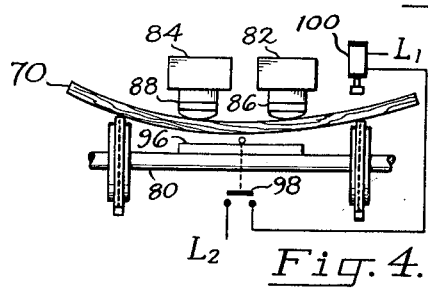
FIG. 4 is a sectional view taken along line 4—4 of FIG. 3 and further illustrating the construction of the apparatus of that figure.

The Apparatus of FIGS. 2, 3 and 4

In the apparatus of FIGS. 2, 3 and 4 lumber pieces 70 are placed in a transverse position with respect to their direction of motion across cleated chains 74, 76. These chains are driven in the indicated direction by sprocket assemblies 78, 80 and provide spaced supports for supporting the ends of the lumber pieces.

As the lumber pieces progress on the conveyor, they traverse a loading station at which load is applied centrally to each piece. In the illustrated form of the invention, the load applying means comprises one or more weighted members 82, 84 mounted on skids 86, 88. These in turn are carried on the extremities of arms 90, 92 which are pivoted to a common support member 94.

A guide plate 96 is located below the lumber pieces at the loading station.

As in the embodiment of FIG. 1, detecting means are provided for determining when the flexing of the lumber pieces reaches a predetermined limit upon application of load. This comprises a switch 98 in an electric circuit with a marker 100.

In the operation of the apparatus of FIGS. 2, 3 and 4, lumber pieces 70 are placed crosswise on cleated chains 74, 76. They move continuously past the loading station where they are traversed by skids 86, 88 which support weights 82, 84. The latter have a weight sufficient to apply the predetermined proof-load required by the working stress to be attained, as determined by multiplying the specified normal load by the various correction factors discussed hereinabove.

Lumber pieces having the required stress capacity pass through the apparatus without incident. However, if the pieces have inherent weaknesses they are deflected under load sufficiently to energize switch 98 which, in turn, actuates reject marker 100. These pieces accordingly are marked and subsequently sorted out.

Thus it is apparent that by the present invention, we have provided an apparatus for proof testing lumber products which apparatus are applicable on a continuous basis to integral and composite lumber products of diverse classes. The invention is applicable to the entire output of a mill. It does not affect adversely the properties of the accepted pieces. Neither does it destroy a given proportion of the unacceptable fraction, as is the case when spot checking by standard static bending tests is applied. Still further, the specified allowable working load stresses for a given product may be set at actual capacity since those pieces not meeting the stress specification are sorted out. This results in a substantial saving of lumber.

It is to be understood that the forms of our invention herein shown and described are to be taken as preferred examples of the same and that various changes in the shape, size and arrangement of parts may be resorted to without departing from the spirit of our invention or the scope of the subjoined claims.

Having thus described our invention, we claim:

1. Lumber testing apparatus comprising conveyor means having spaced apart drive means for continuously conveying lumber past a loading station, one piece at a time, loading means for applying to each piece as it passes the loading station a load predetermined to effect a deflection which represents a predetermined minimum stress capacity requirement for the pieces to be tested, and detecting means positioned for detecting when the magnitude of deflection exceeds the deflection which represents said predetermined minimum stress capacity.

2. The lumber testing apparatus of claim 1 wherein the drive means are longitudinally spaced with respect to the direction of lumber travel.

3. The lumber testing apparatus of claim 1 wherein the drive means are laterally spaced with respect to the direction of lumber travel and the loading means is mounted for movement freely in the vertical direction for slidably engaging each lumber piece as the latter moves past the loading station.

4. Lumber testing apparatus comprising conveyor means having spaced apart drive means adapted continuously to pass pieces of lumber in a longitudinal direction, electrically controlled load applying means at a loading station intermediate the spaced drive means, the load applying means being operable to apply to each piece a load predetermined to effect a deflection which represents a predetermined minimum stress capacity requirement for the pieces to be tested, limit switch means located on opposite sides of the loading station and in an electric circuit with the loading means, the limit switch means being operable to apply the loading means to each lumber piece as it passes the loading station, and detecting means positioned for detecting when the magnitude of deflection exceeds the deflection which represents said predetermined minimum stress capacity.

5. The lumber testing apparatus of claim 4 wherein the load applying means comprises at least one weighted roller and an electrically controlled, fluid operated cylinder connected thereto for reciprocating it between operative and inoperative positions.

6. The lumber testing apparatus of claim 4 wherein the detecting means comprises a limit switch positioned for contact with the lumber piece at a predetermined position of deflection, and marking means in an electric circuit with the limit switch and positioned for marking the piece upon actuation of the limit switch.

7. Lumber testing apparatus comprising conveyor means including a pair of laterally spaced drive means adapted to move pieces of lumber in a lateral direction with respect to their length, loading means at a loading station between the drive means for applying to each piece as it passes the loading station a load predetermined to effect a deflection which represents a predetermined minimum stress capacity requirement for the pieces to be tested, and detecting means positioned for detecting when the magnitude of deflection exceeds the deflection which represents said predetermined minimum stress capacity.

8. The lumber testing apparatus of claim 7 wherein the loading means comprises a weight mounted on one end of a hinged lever arm in sliding relationship to the lumber pieces as they traverse the loading station.

9. The lumber testing apparatus of claim 7 wherein the detecting means comprises a limit switch at the loading station on the side of the lumber piece opposite the loading means, and lumber marking means in an electric circuit with the limit switch and actuatable by the same to mark the lumber upon energization of the limit switch.

References Cited in the file of this patent
UNITED STATES PATENTS

| | | |
|---|---|---|
| 2,032,989 | Kenney et al. | Mar. 3, 1936 |
| 2,404,584 | Liska et al. | July 23, 1946 |
| 2,693,107 | Paden | Nov. 2, 1954 |